Oct. 8, 1957 J. A. MARKSTRUM 2,808,764
APPARATUS OF MAKING SPIRALLY GROOVED BALL TYPE BEARING MEMBERS
Filed Jan. 22, 1953 11 Sheets-Sheet 1

Fig. 1

INVENTOR.
JOHN A. MARKSTRUM
BY
ATTORNEY

Oct. 8, 1957  J. A. MARKSTRUM  2,808,764
APPARATUS OF MAKING SPIRALLY GROOVED BALL TYPE BEARING MEMBERS
Filed Jan. 22, 1953  11 Sheets-Sheet 3

Fig. 3

INVENTOR.
JOHN A. MARKSTRUM
BY
ATTORNEY

Oct. 8, 1957  J. A. MARKSTRUM  2,808,764
APPARATUS OF MAKING SPIRALLY GROOVED BALL TYPE BEARING MEMBERS
Filed Jan. 22, 1953  11 Sheets-Sheet 4

INVENTOR.
JOHN A. MARKSTRUM
BY
ATTORNEY

Oct. 8, 1957     J. A. MARKSTRUM     2,808,764
APPARATUS OF MAKING SPIRALLY GROOVED BALL TYPE BEARING MEMBERS
Filed Jan. 22, 1953     11 Sheets-Sheet 5

Fig. 5

INVENTOR.
JOHN A. MARKSTRUM
BY
ATTORNEY

Oct. 8, 1957  J. A. MARKSTRUM  2,808,764
APPARATUS OF MAKING SPIRALLY GROOVED BALL TYPE BEARING MEMBERS
Filed Jan. 22, 1953  11 Sheets-Sheet 6

INVENTOR.
JOHN A. MARKSTRUM
BY
ATTORNEY

Oct. 8, 1957   J. A. MARKSTRUM   2,808,764
APPARATUS OF MAKING SPIRALLY GROOVED BALL TYPE BEARING MEMBERS
Filed Jan. 22, 1953   11 Sheets-Sheet 8

Fig.11

INVENTOR.
JOHN A. MARKSTRUM
BY
ATTORNEY

Fig.12

INVENTOR.
JOHN A. MARKSTRUM

Oct. 8, 1957 J. A. MARKSTRUM 2,808,764
APPARATUS OF MAKING SPIRALLY GROOVED BALL TYPE BEARING MEMBERS
Filed Jan. 22, 1953 11 Sheets-Sheet 10

INVENTOR.
JOHN A. MARKSTRUM
BY
ATTORNEY 2,808,764

APPARATUS OF MAKING SPIRALLY GROOVED BALL TYPE BEARING MEMBERS

John A. Markstrum, Detroit, Mich., assignor to Thompson Products, Inc., Cleveland, Ohio, a corporation of Ohio Application January 22, 1953, Serial No. 332,682

10 Claims. (Cl. 90—11.5)

The steering mechanisms of automotive vehicles advantageously employ ball type bearing members having a peripheral bearing surface formed in the contour of a curved plane prescribed by the revolution of a curvilinear generatrix about a fixed axis.

This invention relates generally to ball type bearing members of such description and more particularly relates to a ball type bearing member having a spirally formed groove cut in the curved peripheral surface for lubrication purposes.

This invention further relates to apparatus and methods of cutting spiral grooves in a generated curved surface.

According to the general principles of the present invention, a lubrication groove is provided in the peripheral surface of a ball type bearing member having a peripheral contour prescribed by the revolution of a generatrix about a fixed axis by holding a bearing member and a cutting tool in engagement with one another at a point on the peripheral surface of the bearing member and relatively moving the bearing member and the cutting tool to trace the point with movement of a uniform velocity along a generatrix of the peripheral surface while simultaneously revolving the bearing member about the fixed axis at a uniform angular velocity. The resultant movement between the tool holder and the cutting tool provides a developed spiral path in a curved plane.

The present invention contemplates the provision and utilization of a ball type bearing member wherein a plurality of circumferentially spaced spiral grooves are formed in the peripheral surface of the bearing member so that lubricant sources will be provided in uniformly spaced relation over the entire bearing area and so that the lubricant grooves will be arranged in generally transverse alignment to any normal pivotal movement of the bearing member in ordinary use.

The grooving apparatus provided in accordance with the principles of the present invention more specifically comprises a collet adapted to receive a ball type bearing member as a workpiece. A collet holder mounts the collet for rotation on an axis extending through top and bottom portions of the workpiece, the workpiece including an arcuately curved peripheral surface which extends between the top and bottom portions thereof.

A cutting tool is provided to engage the peripheral surface of the workpiece.

The apparatus includes a frame having a movable cradle carrying the collet holder. Support bearings are located between the cradle and the frame and support the cradle for pivotal movement on an axis generally transverse to the rotational axis of the collet.

A two-directional motor having a driving connection with the cradle is controlled by circuit means including a pair of limit switches actuated by stop members carried on the cradle and engaging the limit switches to selectively reverse the direction of the motor so that the cradle will be pivotally reciprocated between top and bottom positions forming the limits of a confined path of movement complementary to an arc drawn on the peripheral surface of the workpiece and lying in a plane including the rotational axis of the collet and of the workpiece.

A gear train is connected to the collet and to the frame and automatically rotates the collet and the workpiece in response to movement of the cradle.

The two components of motion provided by the simultaneous movement of the cradle and rotation of the collet result in the development of a traced spiral path between the peripheral surface of the workpiece and the cutting tool. There is thus provided a spiral groove in the curved plane of the peripheral surface of the workpiece.

Indexing means are carried by the frame and selectively reposition the gears of the gear train to angularly index the workpiece relative to the cutting tool. In view of such arrangement, a plurality of circumferentially spaced spiral grooves may be formed in the surface of the workpiece merely by selectively reciprocating the cradle between the top and bottom positions.

Although the present invention contemplates the effective utilization of either a stationary cutting tool or a rotatable milling cutter, it should be understood that a plurality of cutting tools and workpiece holders may be provided so that a corresponding plurality of articles may be grooved on each single operation.

In one preferred embodiment of the present invention, a movable tool head is carried on the frame of the grooving machine and is supported by a pair of bearings spaced longitudinally on the frame so that the tool head can be moved toward and away from a work area.

A row of rotatable milling cutters are positioned on the head and are rotatably driven by a motor having a driven connection with each of the cutting tools. A shaft is carried by the tool head and has a crank arm on one end thereof associated with an adjustable locking device located between the crank arm and the frame to lock the tool head in an adjusted limit position. The other end of the shaft is provided with an actuating handle.

A movable cradle extending generally longitudinally of the frame of the machine is pivotally supported to move in a confined arcuate path relative to the tool holder and a plurality of rotatable collets are positioned generally uprightly in longitudinally spaced relation on the cradle so as to position a ball type bearing member having a curved peripheral bearing surface in the work area for engagement with one of the corresponding cutting tools.

Each of the collets is coupled by means of a gear train positioned between the respective collets and the frame of the machine so as to rotate each collet whenever the cradle is moved relative to the frame. A separate motor is provided to pivotally reciprocate the cradle. Since the movement of the cradle provides one component of motion and the rotation of the collet provides a second component of motion, the resultant movement between the tool holder and the collet will develop a spiral path in a curved plane as described above.

Indexing means are provided on the frame to selectively reposition the gears of the gear train so that each respective workpiece will be angularly indexed relative to the cutting tool.

Successive cutting operations at different indexed positions will provide a corresponding plurality of spiral grooves on the workpiece.

It is believed that the methods of the present invention will become manifest to those versed in the art upon reading the detailed description of the apparatus provided for practicing the principles of the present invention.

It is an object of the present invention to provide a ball type bearing member having a curved peripheral surface with spiral lubrication grooves. Another object of the present invention is to provide apparatus for cutting a spiral groove in a surface lying on a curved plane.

Yet another object of the present invention is to provide a ball type bearing member having a peripheral contour prescribed by the revolution of a curved generatrix and further including a plurality of circumferentially spaced spiral grooves providing lubricant passages generally transverse to the normal direction of pivotal movement of the bearing member in ordinary usage.

A further object of the present invention is to provide a spiral grooving machine which does not require return travel in cutting spiral grooves on the peripheral surface of a ball type bearing member.

Another object of the present invention is to provide a grooving machine fabricated from a reduced number of simplified components which is economical to make and which may be effectively maintained with a minimum of servicing.

Yet another object of the present invention is to provide apparatus and methods of cutting spiral grooves in a surface lying in a curved plane which can be readily and conveniently practiced and operated by relatively unskilled personnel.

Many other features, advantages and additional objects of the present invention will become manifest to those versed in the art upon making reference to the detailed description which follows and the accompanying sheets of drawings in which a preferred structural embodiment of the principles of the present invention is shown by way of illustrative example only.

Joint structures have been provided in the mechanical arts wherein separate bearing portions are universally rockable so as to accommodate tilting movement of a stem member which may also be required to be rotatable about its own axis.

In such a joint structure, a ball joint is utilized wherein a ball type bearing member includes a segmental spherical bearing surface adapted to provide bearing engagement with a complementary formed segmental spherical recess.

If the bearing surface of the ball type bearing member is truly spherical, the surface contour of the bearing member may be prescribed by the revolution of a generatrix which is essentially circular in character. In other words, the peripheral surface contour of a spherical bearing surface corresponds to a spheroid of revolution.

Not all ball type bearing members are truly spherical in character, however, and, accordingly, the bearing member may comprise an annular ring having a curved peripheral surface prescribed by the revolution of a generatrix about a fixed axis, or only a portion of the peripheral surface may include an arcuately curved peripheral bearing surface symmetrically disposed about a center axis of the annular bearing member.

Figures 6, 8, 9, 10:
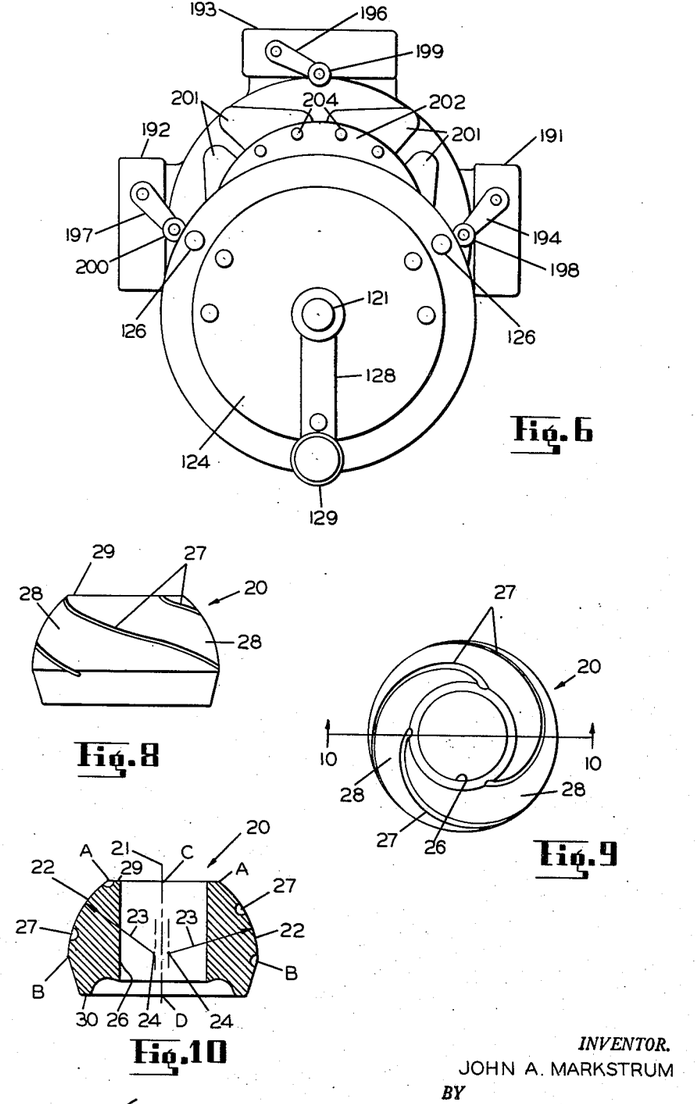
Figure 6 is a fragmentary elevational view showing components of the control mechanism provided in accordance with the principles of the present invention.
Figure 8 is an elevational view of the ball type bearing member provided in accordance with the principles of the present invention.
Figure 9 is a plan view of the ball type bearing member shown in Figure 8.
Figure 10 is a cross sectional view taken generally on line 10—10 of Figure 9.

In Figures 8, 9 and 10, there is shown a ball type bearing member 20.

The bearing member 20 comprises an annular ring having a center axis 21 and includes an arcuately curved peripheral bearing surface 22 which is symmetrical about the axis 21. In this preferred embodiment, the bearing surface is shown lying between points A and B and in the sectional view of Figure 10, it will be noted that the lines AB are formed as the loci of rotation of a radius 23 centered on points 24 which are spaced radially outwardly of the axis 21.

In considering the axis 21 as lying between the points C and D, the entire peripheral surface of the bearing member 20 can be considered a peripheral contour prescribed by the revolution of a generatrix CABD about the fixed axis CD, the portion AB of the generatrix CABD being curvilinear.

It will be understood that if the bearing member 20 were provided with a true segmental spherical surface, the centers 24 of the radius arms 23 would be coincident with the axis 21 and, accordingly, the contour of the bearing member would be a segmental spheroid of revolution.

The bearing member 20 is provided with an open ended bore 26 adapted to receive a stem-like member such as a stud so that tilting action of the stud may be accommodated in a joint structure upon moving the bearing member 20 relative to a housing or the like having a complementary bearing surface engaging the bearing surface 22.

The bearing member 20 will find a particularly useful application in steering assemblies for automotive vehicles wherein the stem member or stud extending through the bore 26 will not only tilt, but may be required to be rotated on the axis 21.

Because of the bearing loads imposed upon the bearing surface 22 of the bearing member 20, it is desirable to provide proper lubrication therefor. In accordance with the principles of the present invention, a plurality of circumferentially spaced spiral grooves 27 are formed in the curved peripheral surface or bearing surface 22. In the preferred embodiment herein shown, each of the spiral grooves 27 is equidistant from the other and spaced at 120° intervals so as to provide bearing surface areas 28 between the grooves which are also spirally shaped and which are of uniform width (Figure 8).

By providing the uniformly spaced spiral grooves 27, an adequate lubricant source is located on the bearing surface 22 and the groove sources extend generally transversely to the normal direction of tilting movement of the ball type bearing member 20 in ordinary usage. Furthermore, the spiral grooves adequately cross any possible rotational movement of the bearing surface 22 so that full lubrication effectiveness of the grooves is insured under all ordinary conditions of usage.

It will be noted that in the particular embodiment herein shown and described, the ball member 20 has a top portion 29 and a bottom portion 30 which lie on spaced parallel planes normal to the axis 21.

The grooves 27 run out of the arcuately curved peripheral bearing surface 22 to insure a full supply of lubricant throughout the entire length of the grooves 27.

In accordance with the principles of the present invention, the grooves 27 are formed in the peripheral surface of the ball type bearing member 20 by holding the bearing member 20 and a cutting tool in engagement with one another at a point on the bearing surface 22 whereupon the bearing member and the cutting tool are relatively moved to trace the point with a movement of uniform velocity along a generatrix of the peripheral surface. The bearing member 20 is simultaneously revolved about the fixed axis 21 at a uniform angular velocity.

The apparatus provided in accordance with the principles of the present invention for practicing the steps described and for producing the article shown in Figures 8, 9 and 10 will now be described in appropriate detail.

A spiral grooving machine is indicated generally by the reference numeral 31 and comprises a frame 32 which is adapted to be stationarily mounted on a firm base.

Figure 2:
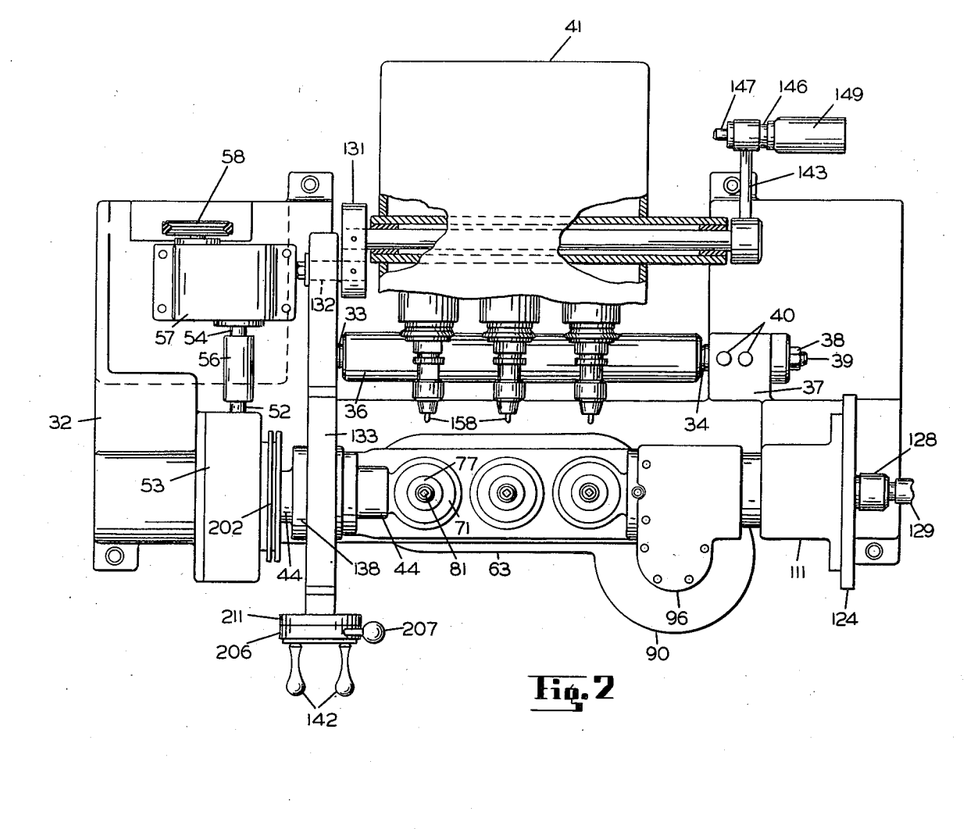
Figure 2 is a plan view of the machine shown in Figure 1.
Figure 5:
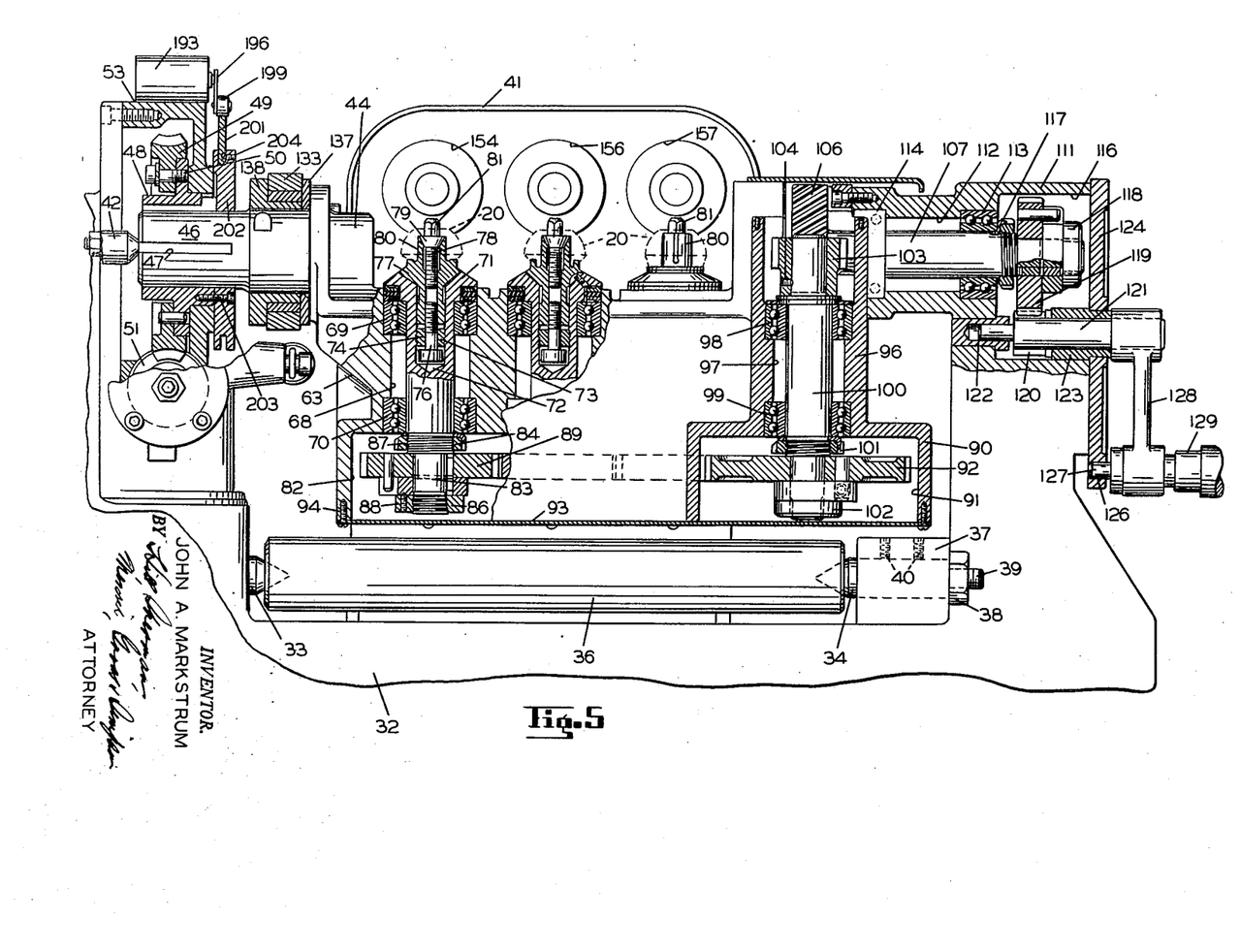
Figure 5 is an enlarged view with parts removed and with parts broken away showing in cross section additional detailed structure of the machine provided in accordance with the principles of the present invention.

The frame is provided with a conical bearing 33 and a conical bearing 34 spaced longitudinally of the bearing 33 pivotally supporting therebetween a pivot axle 36. As is illustrated in Figures 2 and 5, the conical bearings are readily removable, for example, the conical bearing 34 is received in a bracket 37 and may be selectively longitudinally adjusted relative to the pivot axle 36 by adjusting the nut 38 on a threaded stud portion 39 formed on one end of the conical bearing 34. The conical bearing 34 is locked in adjusted longitudinal position by a plurality of set screws 40 which are received in the bracket 37 and which may be threaded into locking engagement with the conical bearing 34.

Figure 12:
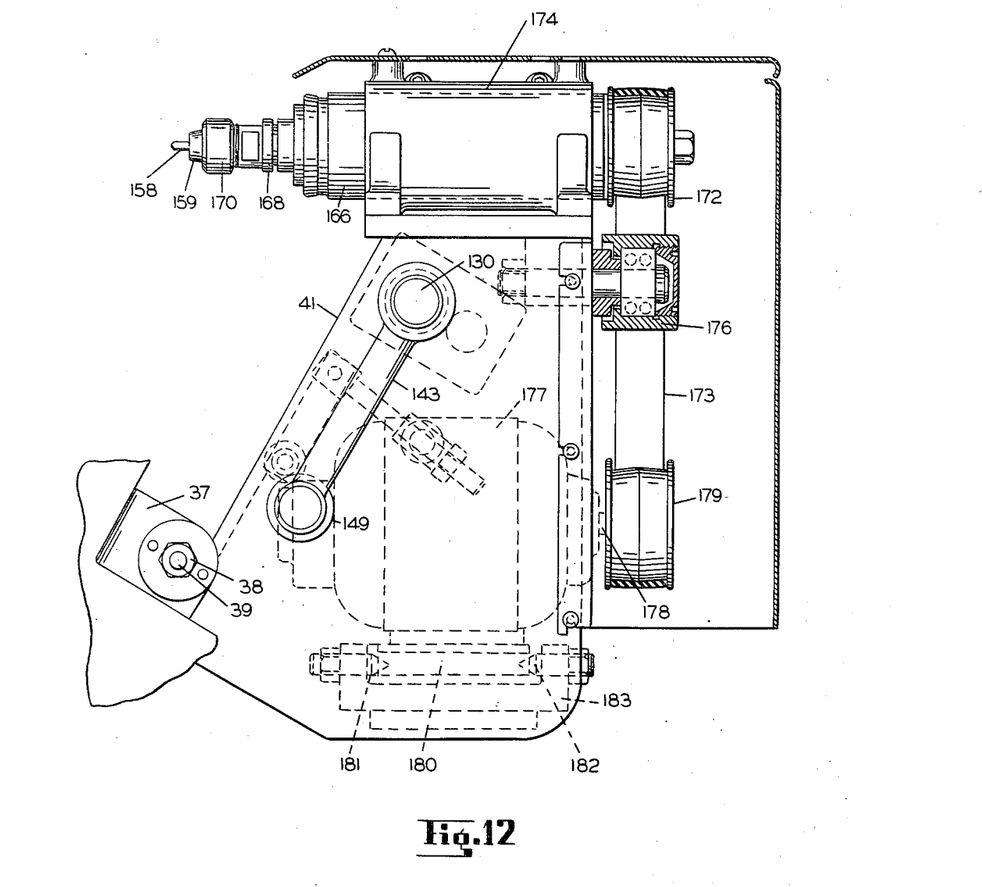
Figure 12 is an elevational view partly in cross section showing the tool head retracted away from the work area.

A tool spindle head 41 is connected in firm assembly with the shaft 36 for pivotal movement relative to the frame 32 between a retracted position (Figures 2, 5 and 12) and an active position (Figure 3) wherein cutting tool means are positioned proximate a work area.

Figure 1:
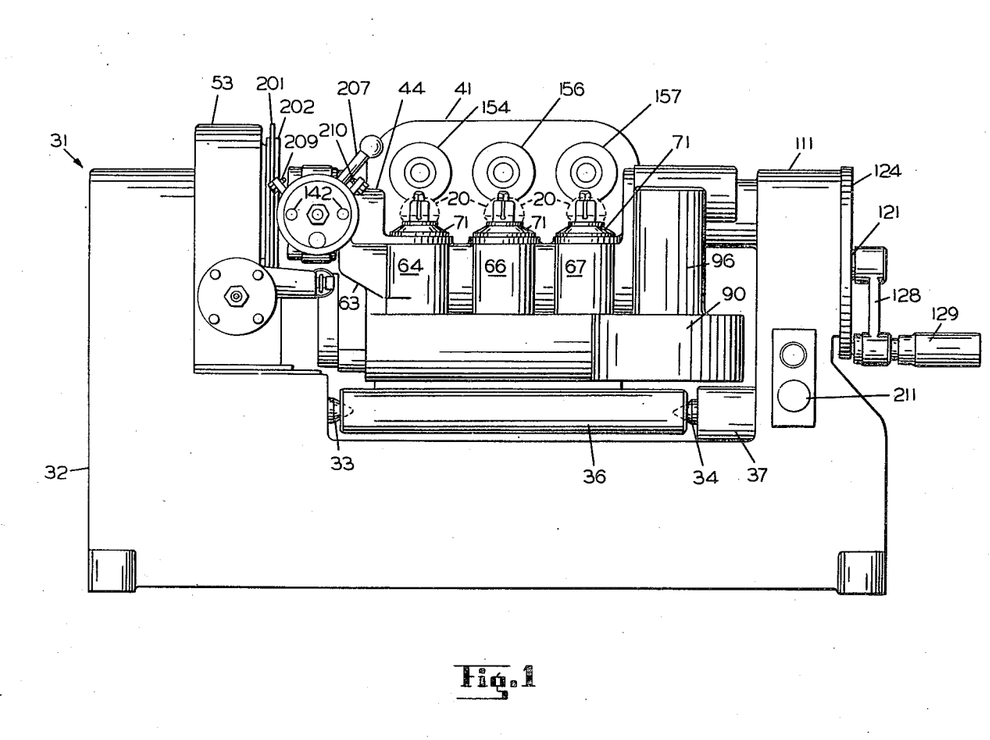
Figure 1 is a front elevational view of a grooving machine provided in accordance with the principles of the present invention.
Figure 7:
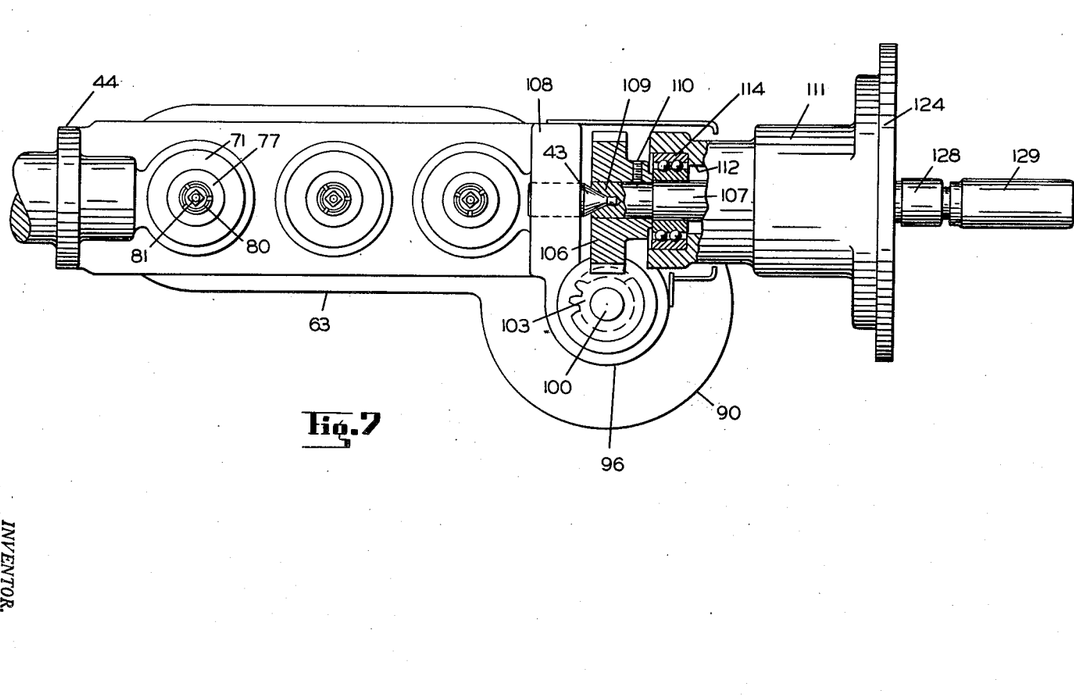
Figure 7 is a fragmentary plan view showing additional details of construction of the apparatus disclosed.
Figure 11:
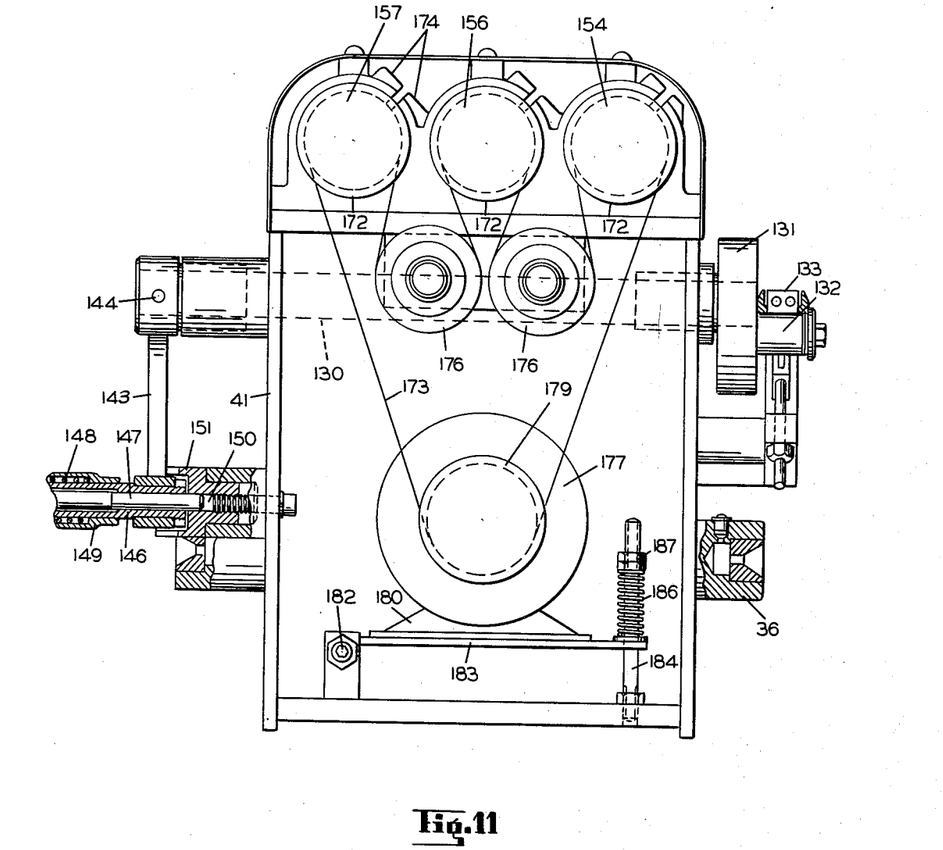
Figure 11 is an enlarged cross sectional view with parts broken away and with parts shown in cross section taken substantially on line 11—11 of Figure 4.

Referring now particularly to Figures 5 and 7 in connection with Figure 1, it will be noted that a conical bearing center 42 is carried by the frame 32 on one side of the tool spindle head 41 and a second conical bearing 43 is carried by the frame 32 in longitudinally spaced relationship to the conical bearing 42 and on the other side of the tool spindle head 41. The conical bearings 42 and 43 pivotally support an irregularly shaped cradle 44 for movement in a confined path relative to the frame 32 and relative to the tool spindle head 41.

Starting at one end of the cradle 44 corresponding to the left side of the drawings, it will be noted that a journal portion 46 engages the conical bearing 42 and is slotted as at 47 to accommodate keying of a coupling member 48 in co-rotatable assembly with the cradle 44.

A spiral gear 49 is securely fastened to the coupling member 48 by a plurality of circumferentially spaced fastener members 50 and meshes with a worm 51 carried on the end of a shaft 52 projecting out of a housing portion encasing the worm and gear 51 and 49, respectively, which is indicated at 53.

Figure 4:
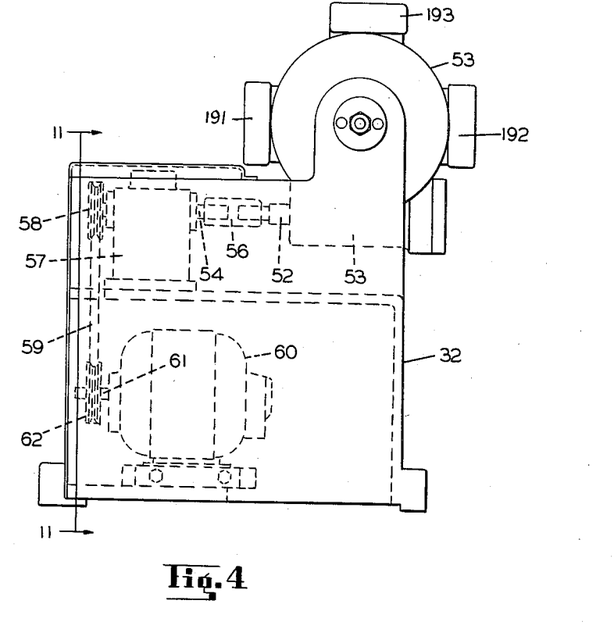
Figure 4 is an end elevational view of the machine shown in Figures 1 and 2 but showing the end opposite that shown in Figure 3 and with parts removed for the sake of clarity.

As is clearly shown upon making reference to Figures 2 and 4, the shaft 52 is connected to a power take-off shaft 54 by a coupling member 56, the power take-off shaft 54 projecting from a gear reduction box 57. The gear reduction box is driven by a pulley wheel 58 engaged by a pulley 59 driven by an electric motor 60 having a drive shaft 61 which also carries a pulley wheel 62 to drivingly engage the pulley 59.

The motor 60 is preferably a two-directional motor and can be selectively operated in opposite directions to pivotally oscillate the cradle 44 for reciprocation in a confined path of movement. The controls for effecting such reciprocation will be described hereinafter.

Moving away from the journal portion 46 of the cradle 44, it will be noted that the cradle 44 is provided with a depending body portion 63 having formed therein a plurality of enlarged cylindrical boss portions. In this embodiment, the enlarged cylindrical boss portions are three in number and are indicated by the reference numerals 64, 66 and 67, respectively (Figure 1). The interior of each of the boss portions 64, 66 and 67 is identical and, accordingly, like reference numerals may be applied to the component parts thereof.

Each of the boss portions is provided with a cylindrical bore indicated at 68. Appropriate enlarged annular recesses are provided in each of the bores 68 to receive axially spaced bearing race assemblies indicated at 69 and 70 rotatably journalling a tool holder collet 71.

Each tool holder collet 71 is provided with a recess 72 which extends into one end thereof and which is threaded as at 73 to receive a similarly threaded retainer 74. A bolt 76 has a head portion at the bottom of the recess 72 to act as a stop against the retainer 74, the shank of the bolt 76 extending through the retainer 74 and threadedly engaging an expanding collet 77. A bolt 78 is threaded into the other end of the expanding collet 77 and includes a conically shaped wedge 79 which engages a plurality of flexible fingers 80 circumferentially spaced relative to the conically shaped wedge 79 so that axial advance of the bolt 78 in the expanding collet 77 upon turning the head portion 81 of the bolt 78 will radially expand the fingers 80.

The normal diametral dimension of the fingers 80 is such as to be received in the bore 26 of the ball type bearing member 20. Thus, a bearing member 20 is conveniently slipped over the fingers 80 whereupon the head portion 81 may be turned to tightly clamp the bearing member in firm assembly with the expanding collet 77 and the collet assembly 71.

At the lowermost portion of the cradle 44, each of the bores 68 opens into an enlarged recess portion 82 which will be referred to hereinafter as a gear chamber. Each of the workpiece holder collets 71 has a shaft portion 83 which extends into the gear chamber 82. The shaft portion 83 is provided with axially spaced threaded portions 84 and 86 receiving retainers 87 and 88, respectively, and clamping therebetween gear members 89 which engagingly mesh with one another and together form a gear train which will insure co-rotation of each of the workpiece holder collets 71. It will be understood, of course, that whenever any of the workpiece holder collets 71 are rotated, the corresponding expanding collet 77 will also be rotated together with the workpieces or bearing members 20 carried thereby.

Moving further towards the other end of the cradle 44, it will be noted that the depending body portion 63 of the cradle 44 is provided with an enlarged cylindrical boss portion 90 having a recess 91 formed therein which communicates with the gear chamber 82 which houses a gear member 92 engagingly meshed with one of the gear members 89.

A cover member 93 is secured to the bottom of the cradle 44 by a plurality of fasteners 94 and serves to close the gear chamber 82 as well as the recess 91.

Superjacent the boss portion 90 is an upstanding cylindrical boss portion 96 having a cylindrical bore 97 extending therethrough and communicating with the recess 91. The bore 97 is appropriately recessed at axially spaced points to receive bearing race assemblies indicated at 98 and 99, respectively, arranged to journal a rotatable shaft 100 which extends through the bore 97 and has an end portion appropriately threaded to receive a pair of spaced retainers 101 and 102, respectively, between which is clamped the gear member 92 so as to be co-rotatable with the shaft 100. At the uppermost portion of the shaft 100, a pinion gear 103 is firmly locked to the shaft 100 by a set screw 104 and meshes with a spiral gear 106 carried on the end of a shaft 107.

It will be noted upon making reference to Figure 7 that adjacent the upstanding cylindrical boss portion 96, the cradle 44 is provided with a second journal portion 108 which carries the conical bearing 43. The conical bearing 43 engages a complementary formed bearing surface provided by a bearing member 109 located at the center of the spiral gear 106.

The spiral gear 106, in turn, is locked to the shaft 107 by a set screw 110 and the shaft 107 is journalled in an upstanding portion 111 of the frame 32 which is formed to provide a cylindrical bore 112 appropriately recessed at spaced axial points to receive bearing race assemblies 113 and 114 provided to journal the shaft 107.

The cylindrical bore 112 opens into a recess 116 which receives the projecting end of the shaft 107. The shaft 107 is appropriately threaded at spaced axial points to receive a pair of retainers 117 and 118 clamping a gear member 119 therebetween for co-rotation with the shaft 107.

The gear member 119 rotates in the recess 116 and engages in meshing relationship a gear 120 carried on a shaft 121 journalled in spaced bushings 122 and 123, respectively, carried by the upstanding frame portion 111.

An indexing plate 124 closes the recess 116 and is provided with a plurality of circumferentially spaced apertures 126 which are adapted to receive the index pin 127 carried by an index actuating handle 128 keyed in firm assembly with the shaft 121 in driving relationship therewith.

In the preferred embodiment herein described, the index plate 124 is provided with three apertures 126 spaced 120° apart. It will be understood that the usual actuating handle 129 is provided on the index actuator 128 to selectively retract the index pin 127 whereupon the index actuator 128 may be angularly displaced to a different index position.

It will be apparent that the gears 120, 119, 106, 103, 92 and 89 form a driving coupling or a gear train connection between the frame 32 and the workpiece collet holders 71 so that rotation of the workpiece collet holders 71 will occur whenever the cradle 44 is relatively angularly displaced in its confined path of movement relative to the frame 32.

Moreover, because of the gear train connection thus provided, selective actuation of the index actuator 128 will re-position each of the gears in the gear train so that each respective workpiece holder collet 71 will also be angularly indexed to re-position the workpieces or bearing members 20 in different angularly aligned index positions.

It will be understood, of course, that the size ratios of the various gears in the gear train are specifically selected to maintain the proper relationship so that a 120° index spacing on the index plate 124 will produce a corresponding 120° index alignment of the respective workpieces or bearing members 20.

Although the present invention broadly contemplates the relative movement of the workpiece and the cutting tool, the preferred embodiment herein shown maintains the cutting tool means in fixed relationship and the workpiece is moved relative thereto. Having aligned the cutting tool means at a predetermined groove cutting depth on a point on the generated curved surface of the workpiece or bearing member 20, the cradle 44 is driven by the motor 60 in a confined path of movement at uniform velocity so that the point of contact between the cutting tool means and the curved surface of the workpiece will trace a line from the original point of contact corresponding to a generatrix of the curved surface.

In other words, as applied to a ball type bearing member herein disclosed, the movement of the cradle 44 corresponds to a path of movement which is complementary to the curvilinear line AB, representing the curved portion of the generatrix CABD.

Furthermore, because of the driving coupling relationship between the workpiece holder collet 71 and the frame 32, each of the workpieces or bearing members 20 will be simultaneously rotated at uniform velocity about an axis CD of the generatrix CABD.

As pointed out previously, the workpieces handled on the machine of the present invention can be spheroids of revolution, but it is oftentimes desirable to make ball joint members wherein the center of curvature 24 is offset from the axis of the workpiece. If the center of curvature of the surface AB is located at 24 and the point 24 is spaced radially outwardly of the axis 21 of the workpiece 20, then when the workpiece is mounted on a spindle or collet 71 of the cradle 44, the axis of the journal 46 will not lie in exactly the same plane as the axes of the mounted workpieces. In practice, therefore, in order to accommodate different parts on a single machine, a mean off-center distance is utilized without serious detriment to the uniformity of depth and the other structural characteristics of the spiral grooves 27 formed in the surface AB.

Ball-type bearing members as utilized, for example, in automotive applications, are required in different sizes for use in different portions of steering linkages and between other movable parts.

"Mean off-center" distance, as referred to herein, refers to an offset cradle swing center in relation to the center-line of the work holding spindle, that would normally coincide with the workpiece dimension of point 24 in Figure 10 of the drawings.

However, because the ball-type bearing member requirements vary in size, the offset distance of point 24 also varies within a limited range. In order to simplify the machine of the present invention and to obviate re-setting the cradle swing when changing the set-up from one size of ball-type bearing member to another, the fixed cradle center is positioned between the end limits determined by the relative positions of the point 24 for a smallest and a largest ball-type bearing member to be handled on the machine, thereby establishing a mean cradle swing center which will maintain a substantially uniform depth of groove from end to end, within permissible tolerances, for each of several different sized ball-type bearing member workpieces.

The outer shape or profile changes relatively from one size ball-type bearing member to the next, due to the change in offset of point 24 in each size and the bore size 26 is also correspondingly altered. The spacing dimension from the point 24 to the face of the large end of the ball-type bearing member also differs. However, variations in the bore size and the spacing dimension are accommodated by forming the work holding collet members 77—80 as an interchangeable means proportioned to accommodate the necessary variations.

Making further reference to Figure 1 in connection with Figures 2 and 11–15, it may be noted that the tool spindle head 41 carries a shaft 130 which extends longitudinally of the tool spindle head 41 in spaced relation to the shaft 36.

At one end of the shaft 130 is provided an eccentric 131 having a crank arm 132 engaged by a transversely extending arm member 133 which is generally rectangular in configuration. The arm 133 is provided with an aperture 134 affording a pivotal connection between the arm 133 and the crank arm 132 and further includes a recessed portion providing a trackway 136 slidably receiving a shoe 137 having bearing means 138 provided therein to journal and support the journal portion 46 of the cradle 44.

Figures 14, 15:
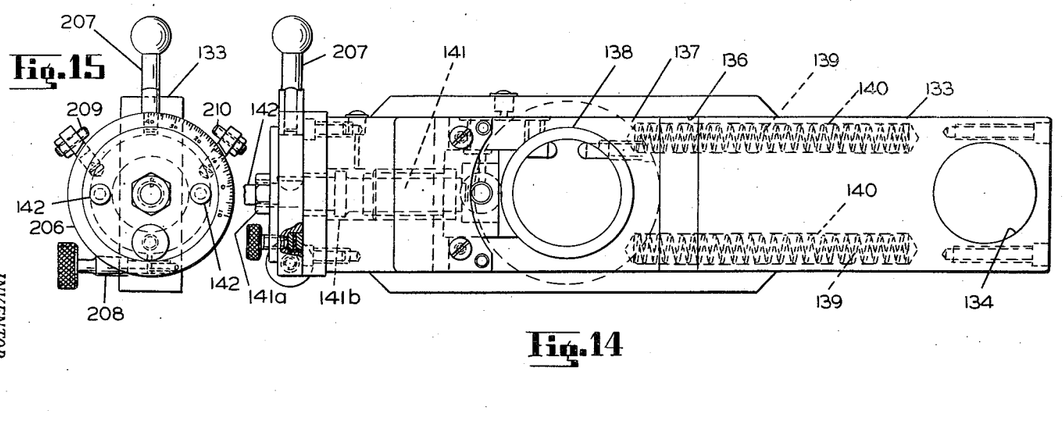
Figure 14 is an elevational view of the device of Figure 13 showing additional details of construction in phantom.
Figure 15 is an end view of the device shown in Figures 13 and 14.

The shoe 137 is placed under spring tension by a pair of compression springs 139 carried in recesses 140 formed in the arm 133 and the shoe 137 may be selectively positioned in the trackway 136 so as to selectively vary the spacing dimension between the tool spindle head 41 and the cradle 44 by rotating an adjusting screw 141. The screw 141 and the arm 133 are confined against relative axial displacement because of the cooperation between the shoulders indicated at 141a and 141b (Figure 14). Thus, the cutter housing 41 is pivoted closer or further away from the workpiece depending upon the direction of rotation of the screw 141.

The adjusting screw 141 may be rotated by actuating handles 142 to selectively rotate the screw 141 in alternate direction whereupon the screw 141 will engage the shoe 137 and will effect relative axial advance or retraction of the shoe 137 and the arm 133 and, hence, the arm 133 will selectively vary the spacing dimension between the tool spindle head 41 and the cradle 44. It will be understood that the springs 139 exert a continuous spring bias against the shoe 137 in order to eliminate backlash in the adjustability of the locking mechanism.

On the other end of the shaft 130 is provided a crank actuating arm 143 which is locked to the shaft 130 by a set screw 144 so as to be co-rotatable therewith. On the end of the crank actuating handle 143 is carried a manual operating handle 146 housing an index pin 147 normally biased in one direction by a spring 148 and selectively retracted by a handle grip 149. The index pin 147 engages an aperture 150 formed in a bushing 151 carried in firm assembly with the tool spindle head 41 and which is arranged to lock the crank actuating handle 143 in a "down position" when the tool spindle head 41 is moved to its forwardmost position (see Figure 3).

Figure 3:
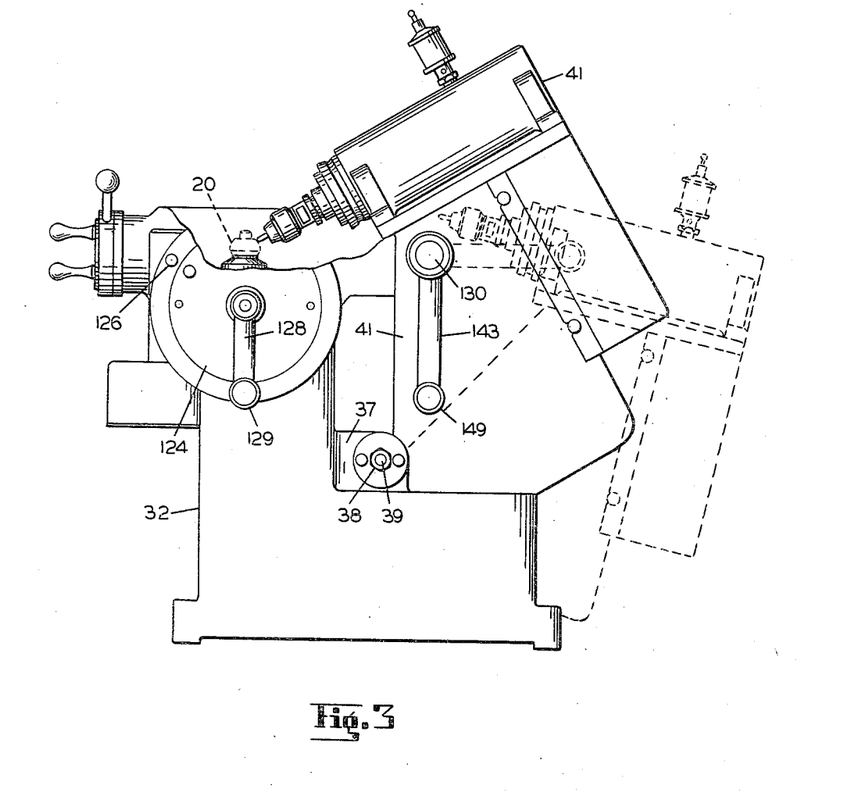
Figure 3 is an end elevational view of the machine shown in Figures 1 and 2.

In order to retract the tool spindle head 41, the index pin 147 is released from the aperture 150 and the crank actuating handle 143 is moved upwardly to the dotted line position of Figure 3 whereupon the shaft 130 will be rotated and the tool spindle head 41 will move about the pivots provided by the conical bearings 33 and 34 to a retracted position shown in dotted lines on Figure 3.

It will be understood that rotation of the shaft 130 and the resultant rotation of the eccentric 131 will result in pivotal movement of the tool spindle head 41 so that the relative movement of the crank arm 132 and the shaft 130 will afford an overcenter toggle action. Thus, when the crank actuating handle 143 is moved downwardly and the tool spindle head 41 is moved towards the work area, the overcenter action of the crank arm 132 relative to the shaft 130 will firmly lock the tool spindle heads so that there will be no relative movement between the tool spindle head and the fixed center determined by the engagement of the arm 133 with the cradle 44.

Figure 16:
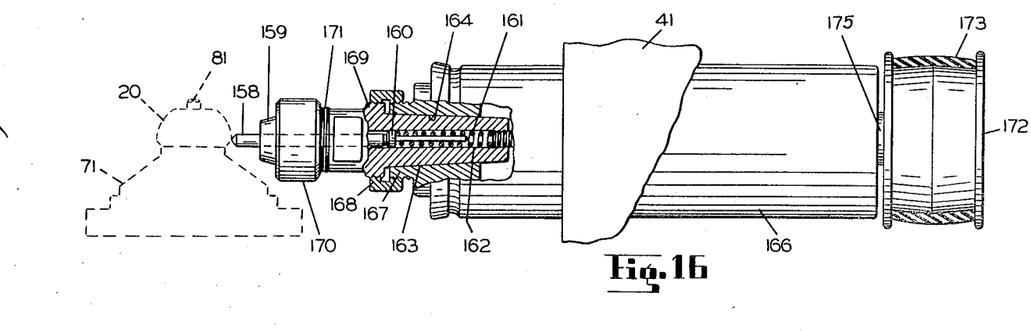
Figure 16 is a fragmentary view with parts broken away and with parts shown in cross section showing additional details of construction of the cutting tool holder provided in accordance with the principles of the present invention.

The tool spindle head 41 is provided with means to carry a cutting tool for each corresponding workpiece or bearing member 20 positioned on the cradle 44. In the preferred embodiment herein described, it will be noted that the tool spindle head 41 is provided with three cutting tool stations 154, 156 and 157, respectively, receiving a cutting tool apparatus more particularly shown in Figure 16.

Either a milling type cutting tool may be provided or a lathe-type cutting tool may be utilized. In the embodiment herein shown, a rotatable milling cutting tool 158 is inserted into a chuck 159 and engages a plunger 160 continuously biased by a spring 161 housed in a bore 162 extending through the chuck 159.

The chuck 159 is provided with a conventional Morse taper 163 received in a correspondingly tapered bore 164 of a barrel forming a housing for the cutting tool apparatus and indicated at 166.

The end of the barrel 166 is provided with a reduced threaded neck 167 and receives a locking collar 168 engaged with a threaded portion 169 on the chuck 159 so as to place the chuck 159 in firm assembly with the barrel 166. A locking ring 170 is threaded onto the chuck 159 as at 171 and radially collapses the split end portions of the chuck 159 into locking assembly with the cutting tool 158.

A shaft portion 175 extends from the other end of the barrel 166 and carries a pulley wheel 172 adapted to be engaged by a pulley belt 173.

Clamping means 174 (Figure 11) are provided at each cutting tool station 154, 156 and 157 to clamp the barrel 166 in position within the tool spindle head 41.

Each of the cutting tool assemblies are identical with one another and, accordingly, like reference numerals have been applied where appropriate. It will be noted that each of the pulley wheels 172 projects rearwardly and a single pulley belt 173 is threaded over each of the respective pulley wheels 172, there being an idler pulley wheel 176 positioned between each respective pair of pulley wheels 172 over which the pulley belt 173 is threaded. An electric motor 177 is provided with a drive shaft 178 having a pulley wheel 179 carried thereon and engages the pulley belt 173 so as to simultaneously rotate each of the cutting tools 158. The electric motor 177 is mounted on a platform 180 pivotally supported by spaced conical bearings 181 and 182 in turn carried by a bracket 183 supported by the tool spindle head 41. The other end of the bracket 183 is carried on an adjusting stud 184 which has a coil spring 186 therearound bottomed against the platform 183 and engaging the adjustment nuts 187 threaded on the stud 184 so that the belt tension of the pulley belt 173 may be selectively varied by altering in selective adjustment the position of the electric motor 177.

Figure 17:
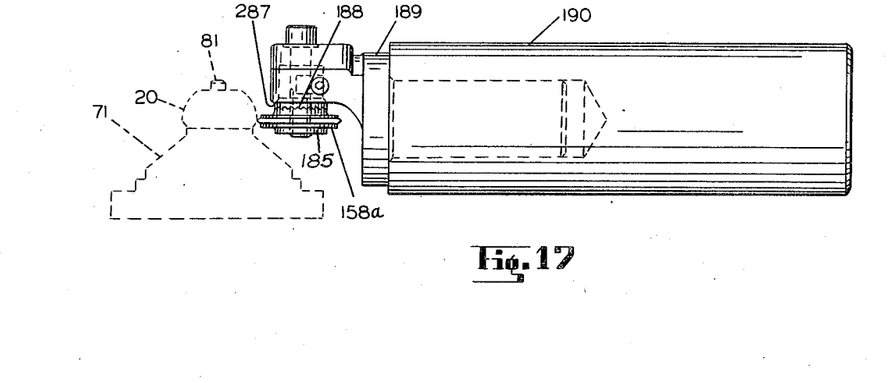
Figure 17 is a view similar to that shown in Figure 16 but showing an alternative embodiment of a cutting tool wherein a stationary cutting tool is used.
Figure 18:
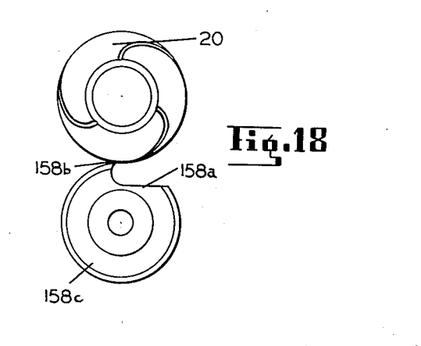
Figure 18 is a fragmentary plan view showing additional details of construction of the cutter tool of Figure 17.

In Figures 17 and 18, an alternative form of cutting tool is provided more particularly comprising a lathe-type cutting tool 158a. The cutting tool 158a has a cutting point 158b which can be re-sharpened within the limits prescribed by the edge 158c. The cutting tool 158a is supported by a bracket 185 which is angularly adjustable and which is retained by a tool holder 287 clamping against the bracket 185. A serrated surface 188 is provided between the tool holder 287 and the bracket 185. The tool holder 287 is carried by a support member 189 inserted into the end of a barrel 190 which can be located in any of the cutting tool stations 154, 156 and 157 in the same manner as the barrels 166.

The housing portion 53 of the frame 32 carries a limit switch assembly 191 and a limit switch assembly 192 at opposite sides thereof and a safety switch assembly 193 on an upper portion thereof (Figures 4 and 6).

Each of the switch assemblies 191, 192, 193 are in electric circuit relationship with the two-directional motor 60 and each switch assembly is provided with a crank-shaped actuating arm 194, 196 and 197, respectively.

The actuating arms 194, 196, 197 are provided with cam rollers 198, 199 and 200, respectively, which extend radially inwardly towards the center of the rotational axis of the journal portion 46 of the cradle 44 and into engagement with a cam wheel 201 carried by a support disk 202 secured in firm assembly with the bracket 48 by a plurality of circumferentially spaced fasteners 203 for co-rotation with the cradle 44.

As may be clearly seen in Figure 6, the cam wheel 201 preferably comprises a plurality of segments which are firmly connected to the disk 202 by fasteners 204 and upon rotation of the disk 204, the working faces of the segments of the cam wheel 201 will engage the cam rollers 198, 199, 200 thereby actuating the crank arms 194, 196, 197 of each of the switch mechanisms 191, 192, 193.

The limit switch assemblies 191 and 192 are so arranged and the segments of the cam wheel 201 are selected so that the limit switch assemblies 191 and 192 will prescribe the limit positions of the confined path of travel of the cradle 44. In other words, since the cradle moves on a pivot axis transverse to the rotational axis of the workpiece or bearing member 20, the cradle 44 must be moved between a top position and a bottom position forming the limits of a confined path of movement complementary to an arc AB drawn on the peripheral surface 22 of the bearing member 20. One of the limit switch assemblies 191, 192 is arranged to be actuated so as to stop the motor 60 when relative movement of the workpiece or bearing member 20 and the cutting tool 158 is at the bottom position and the other of the limit switch assemblies 191, 192 is arranged to actuate the motor 60 when the opposite position is reached.

The limit switch 193 is relied upon to stop overtravel of the cradle 44 if either or both of the limit switches 191 and 192 should fail to operate by having been accidentally thrown out of adjustment, or by wear, or failure from any other cause. Specifically, the lowermost two cams 201 engage alternately the actuating arm rollers 198 and 200 on the limit switches 191 and 192, respectively, as the lowermost cams 201 move with the cradle swing. There is thus established the normal operating swing stop for the cradle 44. The uppermost cams 201 are adjusted so as to not engage actuating arm roller 199 on the limit switch 193 in normal operation. The uppermost cams 201 are set close enough to the roller 199, however, so that in the event of failure of either the limit switch 191 or 192, or both, the cradle swing will be stopped before the cradle comes in contact with the tool spindle head 41 in one direction of swing or causing adjacent parts to come in contact with the cutters in the opposite direction of the cradle swing. Thus, the switch 193 is an emergency switch and its sole mission is to cut off the power, if for any reason the cradle swings beyond a normal working limit.

In order that cutting tools 158 may be readily replaced without changing the relative depth of the grooves 27 formed in the workpieces or bearing members 20, a quick adjusting collar 206 is locked to the rotating ring actuated by the handles 142 and the collar 206 is provided with an upstanding handle 207. The collar 206 is preferably a split ring which can be contracted by a clamping screw 208 into co-rotatable assembly with the actuating ring.

As shown on Figure 15, a pair of fixed stop members 209 and 210 are carried on an enlarged bracket 211 at one end of the arm 133 and are adjustably spaced in selected circumferential alignment to prescribe a predetermined angular movement of the handle 207 and hence, a predetermined angular rotation of the adjusting screw 141. In other words, the angle included between the stops 209 and 210 may be chosen so that movement of the handle 207 from one position corresponding to engagement with the stop member 209 to a second position corresponding to a position at which the handle 207 engages the stop 210 will rotate the screw 141 a sufficient amount to adjust the spacing dimension between the tool spindle head 41 and the cradle 44 an amount equal to the desired depth of the groove 27 in the workpiece or bearing member 20.

Thus, in replacing a cutting tool 158, the handle 207 is moved against the stop member 209 and the tool spindle head 41 is retracted by moving the crank actuating handle 143 upwardly. The cutting tool 158 is then replaced, the new cutting tool 158 being inserted into the chuck 159 and engaged against the bias of the spring 161.

The tool spindle head 41 is then advanced towards the work area and the new cutting tool 158 is engaged with the peripheral surface 22 of the workpiece or bearing member 20. The cutting tool 158 is then securely locked in the chuck 159 by tightening the lock ring 170. Having secured the cutting tool 158 in position, the handle 207 is then moved away from the stop member 209 and into engagement with the stop member 210, thereby rotating the adjusting screw 141 through an angular displacement corresponding to the included angle between the stop members 209, 210 which angular displacement is equal to the desired depth of the groove 27 in the peripheral surface 22 of the bearing member 20.

Since a separate motor 177 is provided for rotating the milling cutting tools 158, a separate electrical control circuit may be provided for the motor 177 which circuit is, in turn, controlled by actuating means indicated on Figure 1 at 211.

Operation

Figure 13:
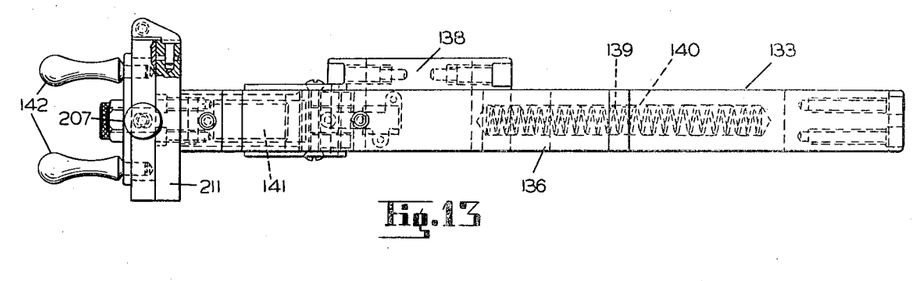
Figure 13 is an enlarged fragmentary view of the adjustable locking device provided to lock the head member of the apparatus in adjusted cutting position.

In setting up the machine, the interchangeable collet members 77—80 are attached in the work-driving spindle and the cutter in-feed handles 142, shown in Figures 13 and 15, are adjusted. It is conceivable that if there is a wide variation in size in changing from one size of ball-type bearing member to another, the cradle swing limiting cams 201 (lower) Figure 6 may require adjustment, otherwise no further adjustments are necessary.

Assuming the cutting tools 158 are properly positioned in the chucks 159 of each of the cutting tool assemblies, the tool spindle head 41 is retracted and a workpiece 20 is placed on each of the expanding collets 77 whereupon the head portions 81 are turned to lock the workpieces 20 for co-rotation with the workpiece holder collets 71.

The motor 177 is energized by actuating the control 211 whereupon the cutting tools 158 will be rotated.

The crank actuating handle 143 is moved from the dotted line position shown in Figure 3 to the full line position shown in Figure 3 so that the tool spindle head 41 will be advanced towards the work area and so that the cutting tools 158 will each engage the peripheral curved surface 22 of each of the workpieces 20.

The motor 60 is energized and angularly displaces the cradle 44 thereby producing a first component of motion between the workpiece 20 and a corresponding cutting tool 158 with uniform velocity along an arc drawn on the peripheral surface 22 and in a plane including the axis 21 which path of movement is prescribed by the pivotal displacement of the cradle 44. Because of the gear train coupling between the workpiece holder collet 71 and the frame 32, the workpiece 20 will be simultaneously rotated at uniform velocity about the axis 21 whereupon a spiral groove will be traced in the surface 22 by the cutting tool 158.

More specifically, the gear 106 is locked against rotation by the engagement of the index pin 127 in the slot 126, but rotation of the workpiece 20 about the axis 21 is caused by the rotation of the gear 103 relative to the locked gear 106 when the cradle 44 is angularly displaced by the motor 60.

As soon as the cutting tool 158 reaches the end of the curve surface 22, an appropriate limit switch assembly 191, 192 will be actuated thereby deenergizing the motor 60.

The index pin 127 is then retracted from the indexing plate 124 by the handle 129 and the indexing actuating handle 128 is rotated so as to reposition the gears of the gear train whereupon each of the workpieces 20 will be angularly shifted through 120°.

The motor 60 is then energized once more so that the motor 60 will rotate in a reverse direction whereupon the cradle 44 will be pivotally reciprocated in an opposite direction and a second spiral groove 27 will be cut in the peripheral surface 22 of each of the workpieces 20. As soon as the cutting tools 158 run beyond the peripheral surface 22 of each of the workpieces 20, the other of the limit switch assemblies 191, 192 will be actuated whereupon the motor 60 will again be deenergized.

The index pin 127 is again retracted from the index plate 124 by the handle 129 and the index actuating handle 128 is angularly displaced through 120° producing a corresponding rotation of the shaft 121 and repositioning the gears of the gear train so that the workpieces will be angularly indexed to a third position relative to the cutting tools 158.

The motor 60 is again energized whereupon the cradle 44 will move through a confined path of movement for purposes of the third cutting stroke.

Upon completion of the third cutting stroke, the tool spindle head 41 is retracted and each of the expanding collets 77 is retracted so that the finished workpieces 20 may be removed and ungrooved blanks may be placed on the expanding collets 77.

Thereafter, the entire cycle is again repeated.

Although various minor structural modifications might be suggested by those versed in the art, it should be understood that I wish to embody within the scope of the patent warranted hereon all such modifications as reasonably and properly come within the terms of my contribution to the art.

I claim as my invention:

1. An apparatus for cutting a spiral lubrication groove in the generated curved surface of a ball-type bearing member, comprising, a rotatable workpiece holder adapted to hold a workpiece having a curved surface intersected by the axis of a relatively stationary cutting tool at a point in said curved surface, a movable cradle carrying said workpiece holder, bearing means between said holder and said cradle journalling said holder for rotation in said cradle on an axis of rotation intersecting the workpiece, a stationary frame supporting said cradle, a crank arm connection between said frame and said cradle at both ends of said cradle confining movement of said workpiece holder in an arc generally complementary to a generatrix traced from said point in said curved surface, a rotatable drive motor pivotally displacing said cradle relative to said stationary frame, and a gear train including gear parts on said workpiece holder and on said frame and effecting rotation of said workpiece holder in response to pivotal displacement of said cradle to move the curved surface of the workpiece in a generally spiral path relative to the cutting tool.

2. A grooving machine comprising, a frame having longitudinally spaced bearings, a pivotally movable cradle extending longitudinally between said bearings and carried by said frame in said bearings, a rotatable workpiece holder journalled in said cradle and adapted to be rotated on an axis intersecting a workpiece and intersecting the pivot axis of the cradle, said workpiece holder adapted to position a workpiece having a peripheral surface formed by the revolution of a generatrix about a fixed axis in a work area, a gear train including gear parts on said workpiece holder and on said frame to rotate said workpiece holder in response to pivotal movement of said cradle, a cutting tool carried by said frame and positioned in the work area to engage the peripheral surface of the workpiece, and crank arm connecting means between said frame and said cradle at opposite ends of said cradle to confine the workpiece holder to a path generally complementary to the generatrix of the peripheral surface of the workpiece, the workpiece holder being simultaneously rotated upon movement of the cradle to trace a spiral path between the peripheral surface of the workpiece and the cutting tool.

3. A grooving machine, comprising, a frame having spaced bearings, a movable cradle pivotally carried by said frame in said bearings, a rotatable workpiece holder journalled in said cradle and adapted to be rotated on an axis intersecting a workpiece, said workpiece holder adapted to position a workpiece having a peripheral surface formed by the revolution of a generatrix about a fixed axis in a work area, a gear train connected between said workpiece holder and said frame to rotate said workpiece holder in response to movement of said cradle, a cutting tool carried by said frame and engaging the peripheral surface of the workpiece, connecting means between said frame and said cradle confining movement of the cradle on a path complementary to the generatrix of the peripheral surface, the workpiece being simultaneously rotated upon movement of the cradle to trace a spiral path between the peripheral surface of the workpiece and the cutting tool, and indexing means connected to said gear train and selectively adjusting the positioning of the gears in the gear train to selectively index the workpiece and the cutting tool at selected angularly spaced points on said axis, whereby a plurality of spiral grooves may be cut in said surface in predetermined spaced relationship to one another.

4. A grooving machine for ball type bearing members, comprising, a collet receiving a workpiece comprising a ball type bearing member having an arcuately curved peripheral surface extending between top and bottom portions thereof, a collet holder mounting and confining said collet for rotation on an axis extending through said top and bottom portions of said workpiece, a cutting tool for engaging said peripheral surface, a frame, a movable cradle carrying said collet holder, support bearings between said cradle and said frame supporting said cradle for pivotal movement about a fixed center on an axis transverse to said rotational axis, a motor moving said cradle between a top position and a bottom position forming the limits of a confined path of movement complementary to an arc drawn on said peripheral surface, and intermeshing gear means including gear parts on said frame and on said cradle operating between said frame and said collet in response to pivotal movement of said cradle for simultaneously rotating said collet and said workpiece in synchronism with pivotal movement of said cradle to trace a spiral path between the peripheral surface of the workpiece and the cutting tool.

5. A grooving machine for a ball type bearing member, comprising, a collet for receiving a workpiece comprising a ball type bearing member having an arcuately curved peripheral surface extending between top and bottom portions thereof, a collet holder mounting said collet for rotation on an axis extending through said top and bottom portions of said workpiece, a cutting tool for engaging said peripheral surface, a frame, a movable cradle carrying said collet holder, support bearings between said cradle and said frame supporting said cradle for pivotal movement on an axis transverse to said rotational axis, a two-directional motor having a driving connection with said cradle, control means controlling said motor and including a pair of limit switches, actuating means carried by said cradle and engaging said limit switches to selectively reverse the direction of the motor and being spaced relative to the path of movement of said cradle to pivotally reciprocate the cradle about a fixed center between top and bottom positions forming the limits of the confined path of movement complementary to an arc drawn on said peripheral surface and intermeshing gear means including gear parts on said frame and on said cradle responsive to pivotal movement of said cradle for simultaneously rotating said collet and said workpiece to trace a spiral path between the peripheral surface of the workpiece and the cutting tool.

6. A grooving machine for a ball type bearing member, comprising, a collet adapted to receive a workpiece comprising a ball type bearing member having an arcuately curved peripheral surface extending between top and bottom portions thereof, a collet holder mounting said collet for rotation on an axis extending through said top and bottom portions of said workpiece, a cutting tool engaging said peripheral surface, a frame, a movable cradle carrying said collet holder, support bearings between said cradle and said frame supporting said cradle for pivotal movement on an axis transverse to said rotational axis, a motor moving said cradle between a top position and a bottom position forming the limits of a confined path of movement complementary to an arc drawn on said peripheral surface and lying in a plane including said rotational axis, a gear train connected to said collet and to said frame and automatically rotating said collet and said workpiece in response to movement of said cradle to trace a spiral path between the peripheral surface of the workpiece and the cutting tool, and indexing means carried by said frame and selectively re-positioning the gears of said gear train to angularly index the workpiece relative to the cutting tool, thereby to cut a plurality of spiral grooves in predetermined space relationship to one another.

7. A grooving machine, comprising, a frame, a pair of bearings spaced longitudinally on said frame and pivotally carrying a movable tool head, a shaft carried by said head and spaced from said bearings, a crank arm on the end of said shaft, an actuating handle on the other end of said shaft for moving said head toward and away from a work area, an adjustable locking device between said crank arm and said frame to lock the head in an adjusted limit position, a tool holder carried by said head and adapted to position a cutting tool in the work area, a movable cradle extending generally longitudinally of said frame and being pivotally supported to move in a confined arcuate path relative to the tool holder, a rotatable collet positioned generally uprightly on said cradle and adapted to position a ball type bearing member having a curved peripheral bearing surface in the work area for engagement with the cutting tool and being movable with said cradle, a coupling between said collet and said frame to rotate said collet whenever said cradle is moved relative to said frame, the rotation of the collet together with the movement of the cradle together developing a resultant movement between the tool holder and the cradle tracing a spiral path in a curved plane.

8. A grooving machine as defined in claim 3, said workpiece holder including an expanding collet having fingers spaced about a longitudinal axis and including an axially advanceable stud having a wedge member therein engaging said fingers to expand the fingers radially outwardly for engaging a workpiece.

9. A grooving machine as defined in claim 7, said collet having fingers spaced about a longitudinal axis and including an axially advanceable stud having a wedge member therein engaging said fingers to expand the fingers radially outwardly for engaging a workpiece.

10. A grooving machine as defined in claim 3, and a a two-directional motor having a driving connection with said cradle to pivotally move said cradle in opposite directions, circuit means controlling said motor and including a pair of limit switches carried by said frame in circumferentially spaced alignment relative to the path of movement of said cradle and arranged to be actuated thereby for controlling the direction of rotation of said motor whereby said cradle is reciprocated in said path of movement.

References Cited in the file of this patent

UNITED STATES PATENTS

| | | |
|---|---|---|
| 928,164 | Taylor | July 13, 1909 |
| 1,097,302 | Conner et al. | May 19, 1914 |
| 1,241,910 | Blake | Oct. 2, 1917 |
| 1,264,929 | Heim | May 7, 1918 |
| 1,949,062 | Marriott et al. | Feb. 27, 1934 |
| 2,429,324 | Meisser | Oct. 21, 1947 |
| 2,494,899 | Ross | Jan. 17, 1950 |
| 2,527,285 | Whitehead et al. | Oct. 24, 1950 |
| 2,651,975 | Soloff | Sept. 15, 1953 |
| 2,681,596 | Klomp | June 22, 1954 |
| 2,687,676 | Marchant | Aug. 31, 1954 |

FOREIGN PATENTS

| | | |
|---|---|---|
| 386,436 | France | 1908 |
| 419,893 | Italy | 1947 |
| 650,279 | Great Britain | May 7, 1948 |
| 867,636 | Germany | Feb. 19, 1953 |